J. POWER.
CULTIVATOR.
APPLICATION FILED MAY 13, 1908.
929,488.
Patented July 27, 1909.
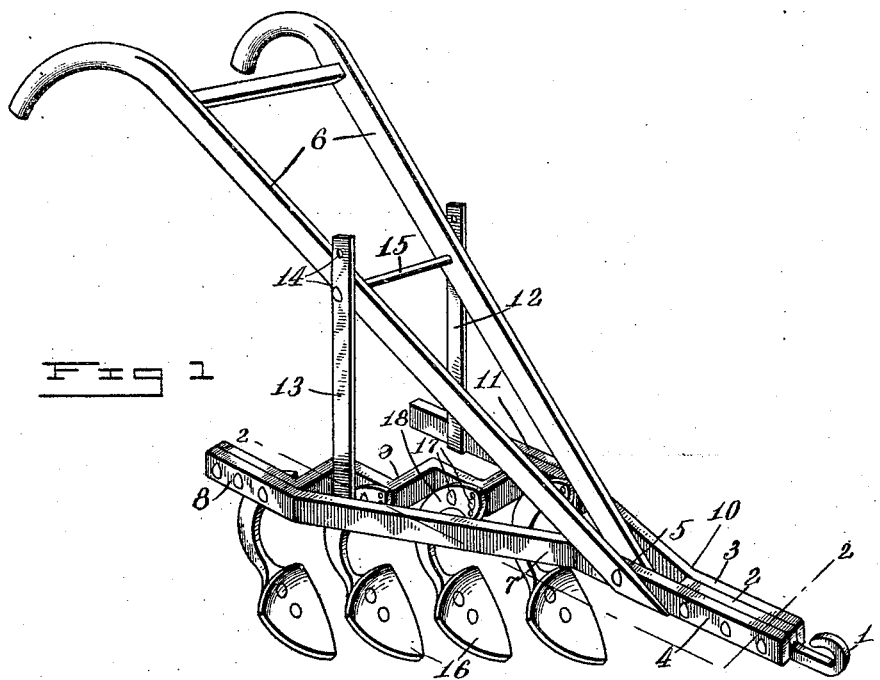
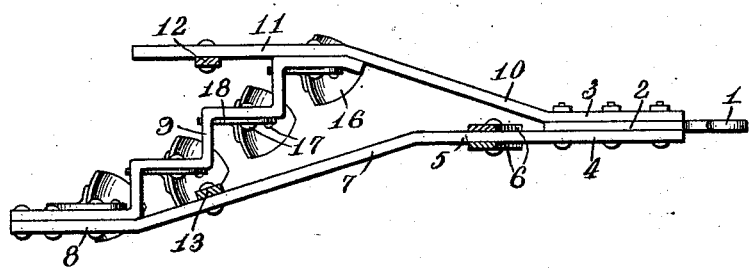
Witnesses
H. A. Robinette
E. A. Pannabaker
Inventor
Jerry Power
By
G. Ayres
Attorney

UNITED STATES PATENT OFFICE.

JERRY POWER, OF SIBLEYTON, MISSISSIPPI.

CULTIVATOR.

No. 929,488.

Specification of Letters Patent.

Patented July 27, 1909.

Application filed May 13, 1908. Serial No. 432,639.

*To all whom it may concern:*

Be it known that I, JERRY POWER, a citizen of the United States, residing at Sibleyton, in the county of Montgomery and State of Mississippi, have invented certain new and useful Improvements in Cultivators, of which the following is a specification.

My invention relates to improvements in cultivators, and it consists in the constructions, combinations and arrangements herein described and claimed.

An object of my invention is to provide an improved cultivator, in which the line of draft will extend in a right plane lying substantially midway between the two guiding handles, and intersecting the middle portion of the transverse series of cultivator teeth; thereby providing an easily guidable cultivator in which the draft will be properly proportioned among the several teeth, or shovels.

A further object of my invention is to provide a cultivator having a rigid frame constructed to strongly support a transverse series of cultivator teeth, or shovels, of any desired type.

Figure 1 is a perspective view illustrating one embodiment of my invention; and Fig. 2 is a plan view on the line 2—2 of Fig. 1.
Referring to the drawings, 1 indicates a draft hook, or eye, provided with an extension 2 which is securely clamped between the parallel forward portions of two side members 3 and 4 of the cultivator frame. The frame member 4 extends backward some distance to provide a straight portion 5 substantially in the line of draft for attachment of the lower ends of the cultivator handles 6. From the rear of the straight portion 5, the side member is inclined outwardly at 7, and terminates in an end straight portion 8 to which is secured one end of a stepped connecting support 9. The side member 3 is inclined outwardly at 10 from the eye extension 2, and terminates in an end straight portion 11 to which is secured the other end of said stepped support 9. The portions 7 and 10 of the side members are shown properly inclined to position the center of the transverse stepped support 9 substantially in the line of draft. A standard 12 is secured to the straight portion 11 of the side member 3, and a similar standard 13 is secured to an opposite portion of the inclined portion 7 of the side member 4. The upper portions of said standards are provided with a series of apertures 14 for receiving a rod 15 to rigidly secure the cultivator handles 6 thereto in an adjustable manner.

Cultivator teeth, or shovels, 16 of any desired form are secured to the forwardly extending portions of each of the several steps of the transverse support 9. As shown in the drawings, each cultivator tooth is advantageously secured in position by two bolts 17 extending through its shank, and with the curved portion 18 of its shank extending in engagement with the transverse portion of the corresponding step in the transverse support. This provides a construction in which the cultivator teeth, or shovels, can be quickly and conveniently assembled, and in which they will be strongly secured in position.

I have illustrated and described a preferred and satisfactory construction, but, obviously, changes could be made within the spirit and scope of my invention.

Having thus described my invention, what I claim as new therein and desire to secure by Letters Patent is:—

In a cultivator, the combination of a transverse support inclined to the line of draft, a series of cultivator teeth carried by said support, a pair of side members secured, respectively, to the front and rear ends of said support and inclined inwardly at the same angle therefrom to substantially the medial line of said support, the member secured to the rear end of said support extending forward parallel to the line of draft a distance equal to the rearward inclination of said support, and a draft hook secured between the front ends of said members, substantially as described.

In testimony whereof I affix my signature in presence of two witnesses.

JERRY POWER.

Witnesses:
J. D. FISACKERLY,
S. C. WILLIAMS.